United States Patent
Liao et al.

(10) Patent No.: US 12,043,995 B2
(45) Date of Patent: Jul. 23, 2024

(54) INDUCTIVE PULL-OUT FAUCET

(71) Applicant: BTCSTAR TECHNOLOGY CO., LTD, Xiamen (CN)

(72) Inventors: Leo Liao, Xiamen (CN); Robot Lin, Xiamen (CN); Guoqiang Wu, Xiamen (CN)

(73) Assignee: BTCSTAR TECHNOLOGY CO., LTD, Xiamen (CN)

(*) Notice: Subject to any disclaimer, the term of this patent is extended or adjusted under 35 U.S.C. 154(b) by 84 days.

(21) Appl. No.: 18/052,585

(22) Filed: Nov. 4, 2022

(65) Prior Publication Data
US 2023/0089841 A1    Mar. 23, 2023

Related U.S. Application Data

(63) Continuation-in-part of application No. PCT/CN2021/129666, filed on Nov. 10, 2021.

(30) Foreign Application Priority Data

May 12, 2021  (CN) .......................... 202121012320.0

(51) Int. Cl.
*E03C 1/05* (2006.01)
*E03C 1/04* (2006.01)
*F16K 31/06* (2006.01)

(52) U.S. Cl.
CPC .............. *E03C 1/057* (2013.01); *E03C 1/04* (2013.01); *F16K 31/0675* (2013.01); *E03C 2001/0415* (2013.01)

(58) Field of Classification Search
CPC .. F16K 31/082; F16K 31/086; F16K 31/0675; E03C 1/04; E03C 1/057; E03C 2001/0415; G01D 5/145
USPC ....................................................... 251/129.04
See application file for complete search history.

(56) References Cited

U.S. PATENT DOCUMENTS

| 5,197,508 | A | * | 3/1993 | Gottling | ................... | F16K 11/04 |
| | | | | | | 251/129.08 |
| 5,669,413 | A | * | 9/1997 | Hegglin | ................ | F25B 41/325 |
| | | | | | | 137/554 |
| 5,694,653 | A | * | 12/1997 | Harald | ..................... | E03C 1/057 |
| | | | | | | 4/678 |
| 6,670,806 | B2 | * | 12/2003 | Wendt | .................. | F16K 37/0041 |
| | | | | | | 137/554 |
| 7,032,878 | B2 | * | 4/2006 | Coura | .................. | F16K 37/0033 |
| | | | | | | 137/554 |

(Continued)

*Primary Examiner* — Matthew W Jellett

(57) ABSTRACT

An inductive pull-out faucet includes a faucet body defining a pulling channel, a pull-out hose movably disposed in the pull-out channel and defining a water outlet channel, a pulling head connected with a water outlet end of the pulling hose, a control valve configured to control opening and closing of the water outlet channel, and a switch assembly electrically connected with the control valve. The switch assembly includes a metal component connected with one of the faucet body and the pull-out hose and an induction coil component connected with the other one of the faucet body and the pull-out hose. During a pulling process, when an attenuation value or an inductance value of an alternating magnetic field generated by approaching or moving away of the metal component from the induction coil component reaches a respective predetermined value, the control valve controls the water outlet channel to open or close.

5 Claims, 7 Drawing Sheets

(56) References Cited

U.S. PATENT DOCUMENTS

| | | | | |
|---|---|---|---|---|
| 7,070,161 | B2* | 7/2006 | Piehl | F16K 31/0613 |
| | | | | 251/129.08 |
| 8,613,419 | B2* | 12/2013 | Rodenbeck | E03C 1/055 |
| | | | | 251/129.03 |
| 8,939,429 | B2* | 1/2015 | Sawaski | E03C 1/057 |
| | | | | 251/129.04 |
| 9,032,565 | B2* | 5/2015 | Loeck | E03C 1/057 |
| | | | | 251/129.04 |
| 9,194,110 | B2* | 11/2015 | Frick | E03C 1/055 |
| 9,909,686 | B2* | 3/2018 | Feinauer | F16K 37/0041 |
| 9,976,290 | B2* | 5/2018 | Evans | F16K 19/006 |
| 10,450,731 | B2* | 10/2019 | McHale | E03C 1/046 |
| 10,612,221 | B2* | 4/2020 | Yan | A47L 15/449 |
| 11,761,181 | B2* | 9/2023 | Chen | E03C 1/0404 |
| | | | | 4/619 |
| 2006/0200903 | A1* | 9/2006 | Rodenbeck | G01S 17/04 |
| | | | | 4/623 |
| 2016/0177551 | A1* | 6/2016 | Li | G01R 33/07 |
| | | | | 324/251 |
| 2019/0330828 | A1* | 10/2019 | Yan | E03C 1/025 |

* cited by examiner

INDUCTIVE PULL-OUT FAUCET

TECHNICAL FIELD

The present disclosure relates to a technical field of processing tools, and in particular to an inductive pull-out faucet.

BACKGROUND

Since a pull-out faucet generally comprises a pull-out head that is freely pulled by people for water discharge, it is convenient for cleaning and is widely loved by consumers. Conventional pull-out faucets are generally controlled by a manual valve core, which is inconvenient to use. Therefore, an electronic pull-out faucet is developed. The electronic pull-out faucet realizes effect of water coming out of the pull-out head when people pull out a pull-out head of the electronic pull-out faucet, and realizes effect of stopping the water from the pull-out head when the pull-out head is reset, which is convenient to use.

Conventional electronic pull-out faucets generally use mechanical contact switches. The mechanical contact switches adopt principle of mechanical contact and have a complex structure. A position of a pulling hose of the electronic pull-out faucet is not fixed, leading to a high assembly precision of the mechanical contact switch. If the mechanical contact switch is not precisely assembled, the mechanical contact switch is easy to be triggered. Moreover, the mechanical contact switch is an actuating structure, making it inconvenient to pour glue, so the mechanical contact switch is unable to isolate water vapor, and the mechanical contact is easily corroded.

SUMMARY

The present disclosure provides an inductive pull-out faucet. A switch assembly of the inductive pull-out faucet has no sliding contacts, is not affected by non-metallic factors such as dust during operation, has low power consumption and long life, and can be used in various harsh conditions.

To achieve the above piece, the present disclosure provides an inductive pull-out faucet.

The inductive pull-out faucet comprises a faucet body defining a pulling channel, a pull-out hose movably disposed in the pull-out channel, a pulling head connected with a water outlet end of the pulling hose, a control valve configured to control opening and closing of the water outlet channel, and a switch assembly electrically connected with the control valve.

The pull-out hose defines a water outlet channel. The switch assembly comprises a metal component and an induction coil component. The metal component is fixedly connected with one of the faucet body and the pull-out hose. The induction coil component is fixedly connected with the other one of the faucet body and the pull-out hose. During a pulling process of the pull-out hose, the metal component is close to or away from the induction coil component to generate an alternating magnetic field. When an attenuation value of the alternating magnetic field reaches a first predetermined value or when an inductance value of the alternating magnetic field reaches a second predetermined value, the control valve controls the water outlet channel to open or close.

Optionally, the metal component is a metal sleeve sleeved on an outer side of the pull-out hose. The induction coil component is disposed in the faucet body.

Optionally, the faucet body comprises a magnetic core. The magnetic core is disposed in a direction perpendicular to an axis line of the pull-out hose. The induction coil component is wound around an outer periphery of the magnetic core.

Optionally, one side of the induction coil component facing the metal component is defined as an induction surface.

Optionally, the metal component is made of iron, copper, or stainless steel.

Optionally, the metal component comprises a first metal piece and a second metal piece. The first metal piece and the second metal piece are arranged at different heights of the metal sleeve. A height of the first metal piece differs from a height of the second metal piece.

Optionally, the induction coil component comprises a first induction coil and a second induction coil. The first induction coil and the second induction coil are arranged at different heights of the faucet body. Turns of the first induction coil differ from turns of the second induction coil.

Optionally, the faucet body comprises a U-shaped frame disposed inside the faucet body. The induction coil component is wound on the U-shaped frame and cooperates with the metal component to form a U-shaped magnetic circuit.

Optionally, the inductive pull-out faucet further comprises a circuit control board and an infrared sensing window.

In the present disclosure, the inductive pull-out faucet comprises the faucet body defining the pulling channel, the pull-out hose movably disposed in the pull-out channel, the pulling head connected with the water outlet end of the pulling hose, the control valve configured to control the opening and closing of the water outlet channel, and the switch assembly electrically connected with the control valve. The pull-out hose defines a water outlet channel. The switch assembly comprises a metal component and an induction coil component. The metal component is fixedly connected with one of the faucet body and the pull-out hose. The induction coil component is fixedly connected with the other one of the faucet body and the pull-out hose. During the pulling process of the pull-out hose, the metal component is close to or away from the induction coil component to generate the alternating magnetic field. When the attenuation value of the alternating magnetic field reaches the first predetermined value or when the inductance value of the alternating magnetic field reaches the second predetermined value, the control valve controls the water outlet channel to open or close. The switch assembly of the inductive pull-out faucet has no sliding contacts, is not affected by non-metallic factors such as dust during operation, has low power consumption and long life, and can be used in various harsh conditions.

BRIEF DESCRIPTION OF DRAWINGS

The drawings are included to provide a further understanding of embodiments of the present disclosure, which form parts of the embodiments. The exemplary embodiments of the present disclosure and the description thereof are used to explain the present disclosure, and do not constitute an improper limitation of the present disclosure. In the attached drawings.

In the drawings.

10—faucet body; 11—pulling channel; 20—pull-out hose; 21—water outlet channel; 30—pulling head; 40—metal component; 41—first metal piece; 42—second metal piece; 50—induction coil component; 51—firdt induction coil; 52—second induction coil; 60—magnetic core; 70—U-shaped frame; 80—circuit control board; 90—infrared sensing window.

DETAILED DESCRIPTION

In order to make problems solved by the present disclosure, technical solutions, and advantages of the present disclosure clearer, the following further describes the present disclosure in detail with reference to accompanying drawings and embodiments. It should be understood that the specific embodiments described here are only used to explain the present disclosure, but not to limit the present disclosure.

Embodiment 1

Figure 1:
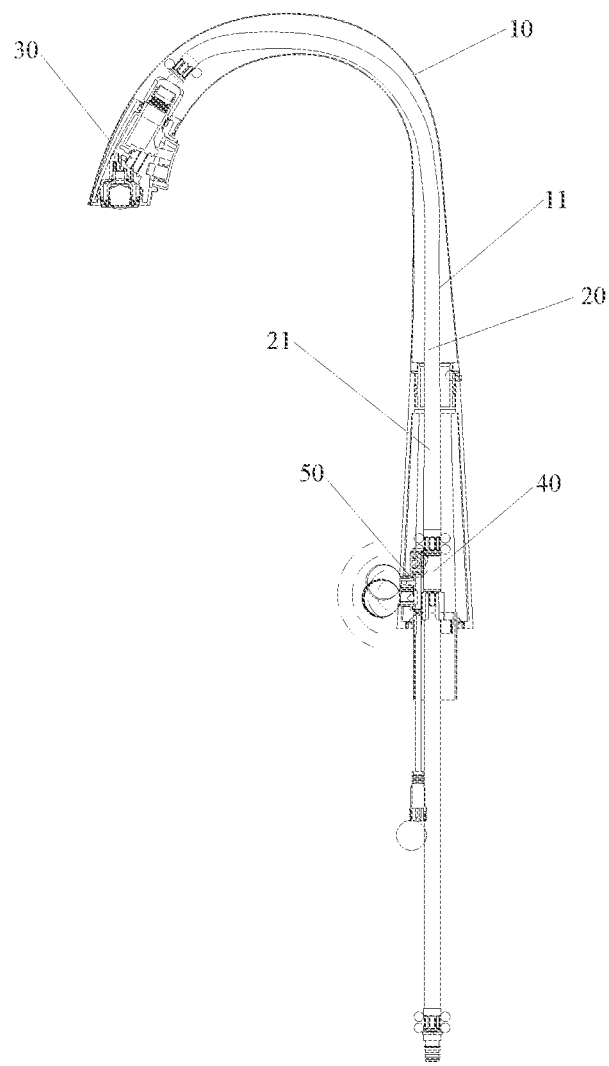
FIG. 1 is a cross-sectional schematic diagram of an inductive pull-out faucet according to a first embodiment of the present disclosure.
Figure 2:
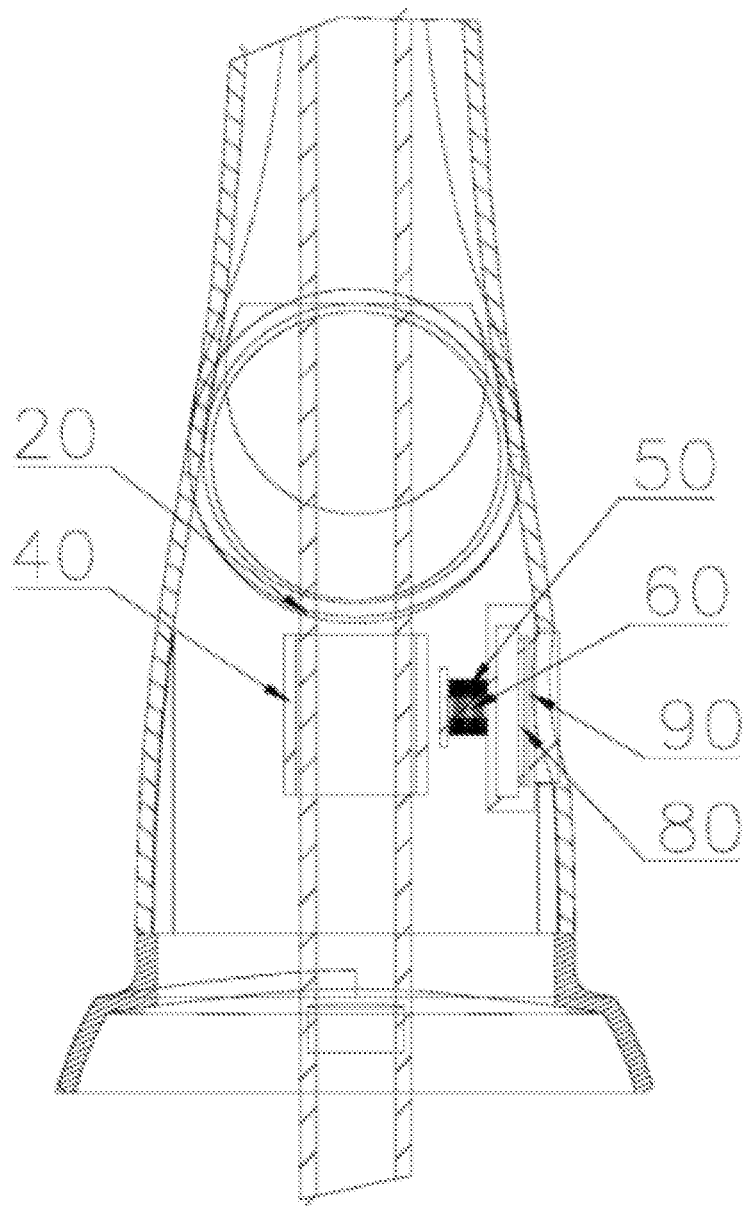
FIG. 2 is another cross-sectional schematic diagram of the inductive pull-out faucet according to the first embodiment of the present disclosure.

As shown in FIGS. 1 and 2, the embodiment of the present disclosure provides an inductive pull-out faucet. The inductive pull-out faucet comprises a faucet body 10 defining a pulling channel 11, a pull-out hose 20 movably disposed in the pull-out channel 11, a pulling head 30 connected with a water outlet end of the pulling hose 20, a control valve configured to control opening and closing of the water outlet channel 21, and a switch assembly electrically connected with the control valve.

The pull-out hose 20 defines a water outlet channel 21. The switch assembly comprises a metal component 40 and an induction coil component 50. The metal component 40 is fixedly connected with one of the faucet body 10 and the pull-out hose 20. The induction coil component 50 is fixedly connected with the other one of the faucet body 10 and the pull-out hose 20. During a pulling process of the pull-out hose 20, the metal component 40 is close to or away from the induction coil component 50 to generate an alternating magnetic field. When an attenuation value of the alternating magnetic field reaches a first predetermined value or when an inductance value of the alternating magnetic field reaches a second predetermined value, the control valve controls the water outlet channel to open or close.

In the embodiment, the metal component 40 is a metal sleeve sleeved on an outer side of the pull-out hose 20. The induction coil component 50 is disposed in the faucet body 10.

In the embodiment, the faucet body 10 comprises a magnetic core 60. The magnetic core 60 is disposed in a direction perpendicular to an axis line of the pull-out hose 20. The induction coil component 50 is wound around an outer periphery of the magnetic core 60.

In the embodiment, one side of the induction coil component 50 facing the metal component 40 is defined as an induction surface.

In the embodiment, the metal component 40 is made of iron, copper, or stainless steel. Specifically, the metal component 40 is made of iron in the embodiment.

In the embodiment, the inductive pull-out faucet further comprises a circuit control board 80 and an infrared sensing window 90.

The working principle of the inductive pull-out faucet is as follow.

A circuit of the induction coil component 50 generates an alternating current. When the metal component 40 approaches, an eddy current is generated on a surface of the metal component 40, so as to realize position recognition of the pull-out hose. Opening and closing of the control valve is controlled by the circuit control board 80 and the control valve controls the opening and closing of the water outlet channel 21 of the pull-out hose 20.

Embodiment 2

Figure 3:
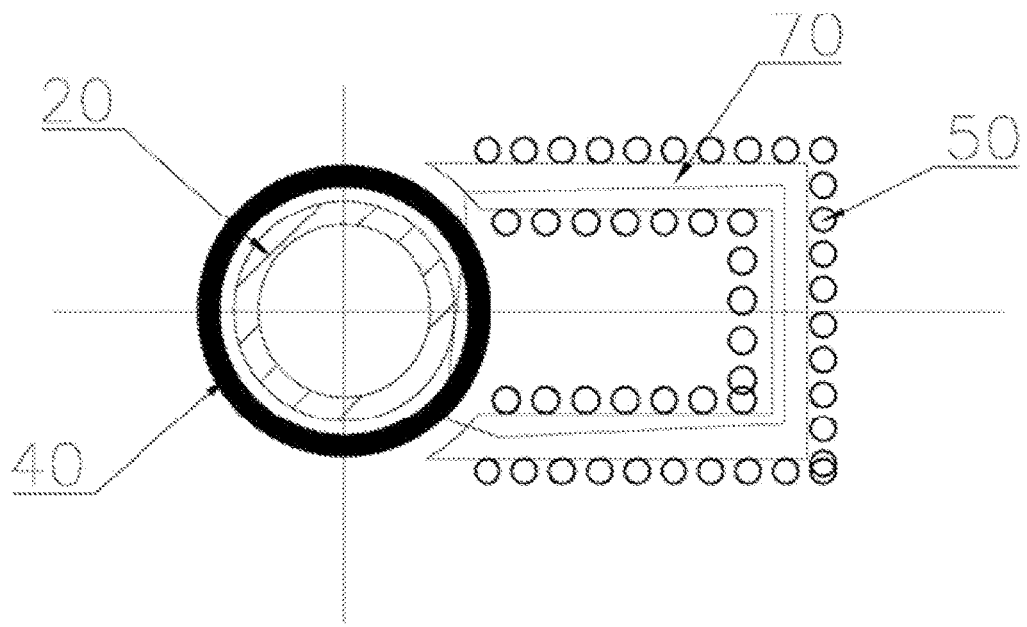
FIG. 3 is a cross-sectional schematic diagram of a pull-out hose and a u-shaped frame of the inductive pull-out faucet according to a second embodiment of the present disclosure.
Figure 4:
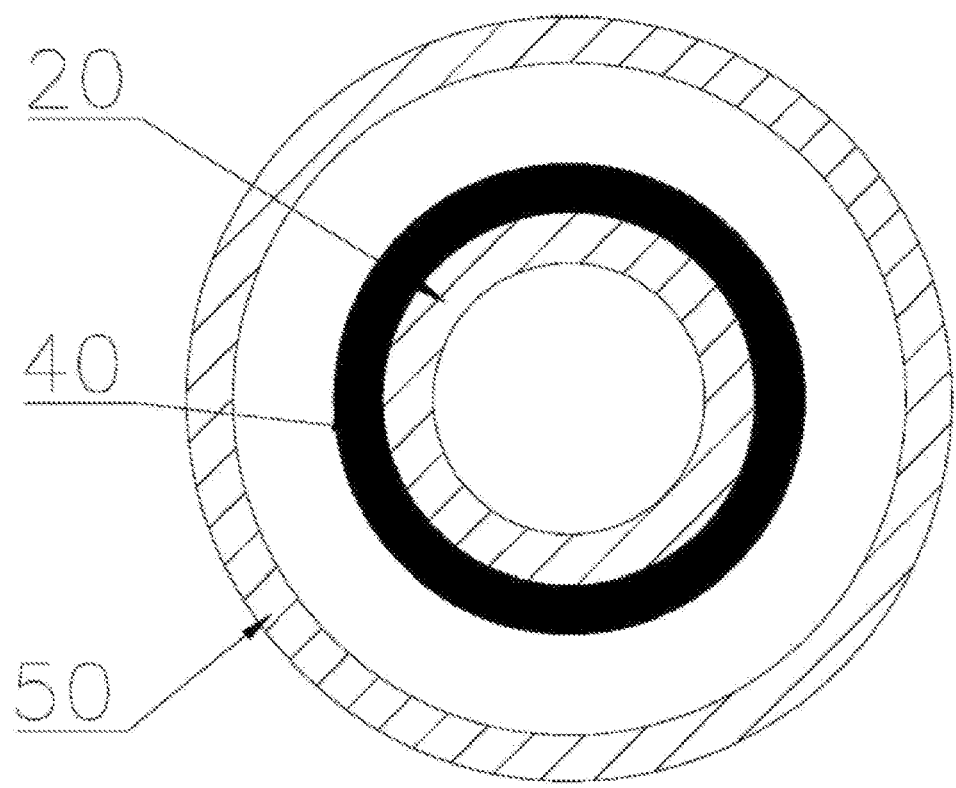
FIG. 4 is a cross-sectional schematic diagram of the pull-out hose of the inductive pull-out faucet according to the second embodiment of the present disclosure.

As shown in FIGS. 3 and 4, a main difference between the Embodiment 2 and the Embodiment 1 is that the faucet body 10 of the Embodiment 2 comprises a U-shaped frame 70 disposed inside the faucet body 10. The induction coil component 50 is wound on the U-shaped frame 70 and cooperates with the metal component 40 to form a U-shaped magnetic circuit.

In the embodiment, the metal component 40 is made of magnetically permeable material.

Other undescribed features are consistent with the Embodiment 1, and are repeated herein. It is notated from the above-mentioned embodiments that the induced water output by pulling out the pull-out hose is triggered by detecting relative position change between the metal component 40 on the pull-out hose 20 and the induction coil component 50.

However, in practical situations, in order to increase flexibility of the pull-out hose 20, the pull-out hose 20 is generally an elastic hose. Elongation and shrinkage of the elastic hose of the embodiment are relatively large in a cold environment and a hot environment. When the pull-out hose 20 is retracted, it may occur that the metal component 40 is not within an induction area of the induction coil component 50, which causes a failure of closing the water outlet channel.

Figure 5:
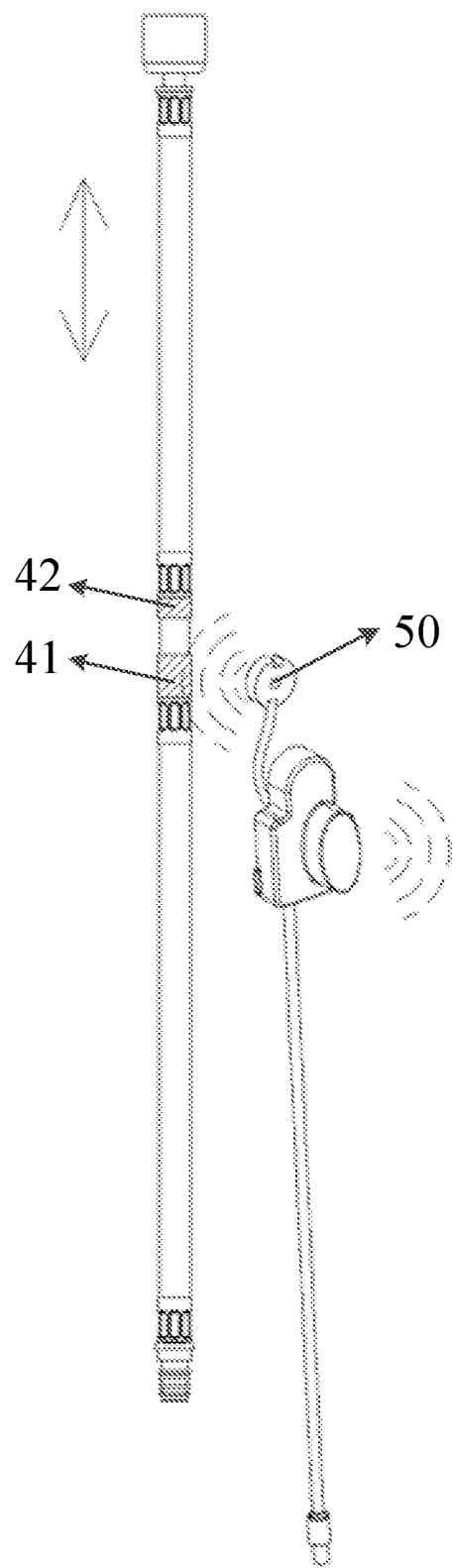
FIG. 5 is a schematic diagram showing a position of a metal component of the pull-out hose according to one embodiment of the present disclosure.
Figure 6:
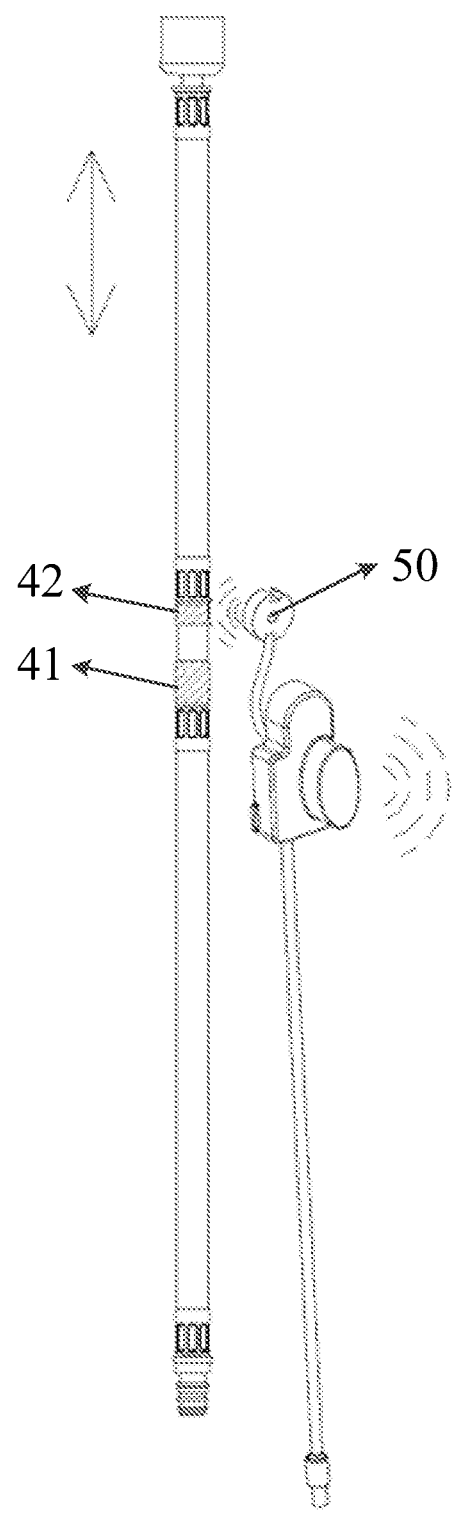
FIG. 6 is another schematic diagram showing the position of the metal component of the pull-out hose according to one embodiment of the present disclosure.

Therefore, as shown in FIGS. 5 and 6, in one embodiment, the metal component 40 comprises a first metal piece 41 and a second metal piece 42. The first metal piece 41 and the second metal piece are arranged at different heights of the pull-out hose 20. A height of the first metal piece 41 differs from a height of the second metal piece 42.

Specifically, in the embodiment, during a pull-out process, the induction coil component 50 first senses the first metal piece 41 and then senses the second metal piece 42. During a retraction process, the induction coil component 50 first senses the second metal piece 42 first and then senses the first metal piece 41. Since the length of the first metal piece 41 differs from the height of the second metal piece 42, sensing time is also different. In this way, through sensed time signals, a current pulling direction is identified, and it is predetermined that the water only flows in a pull-out direction. Therefore, the induction coil component is prevented from failing to sense or mis-sensing the metal component 40 due to the metal component 40 being out of position, and an occurrence of functional failure of the inductive pull-out faucet is avoided.

Figure 7:
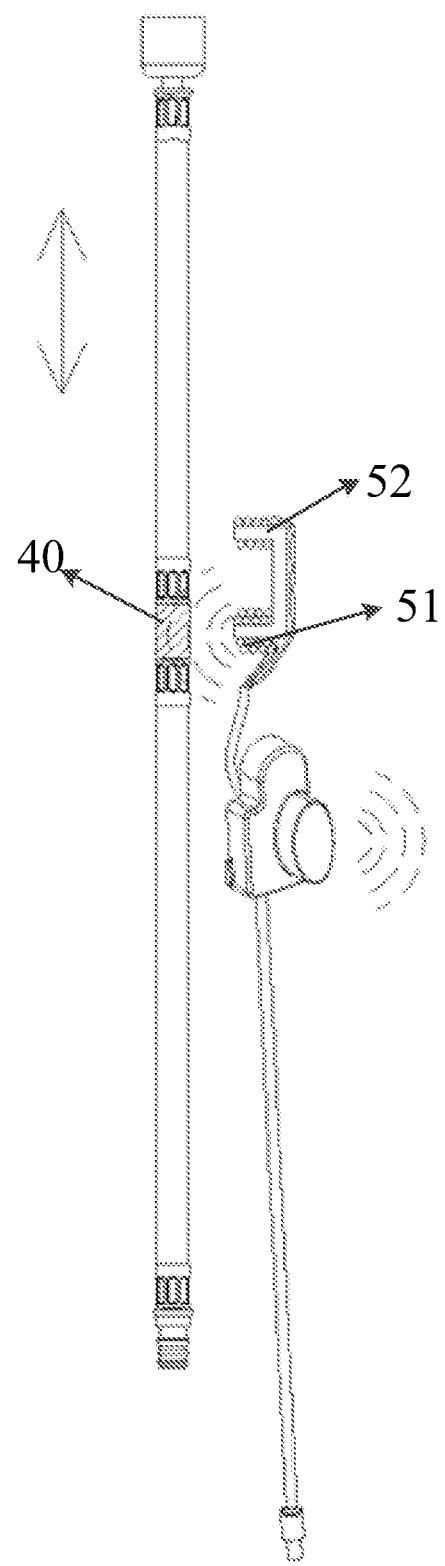
FIG. 7 is another schematic diagram showing a position of an induction coil of the pull-out hose according to one embodiment of the present disclosure.
Figure 8:
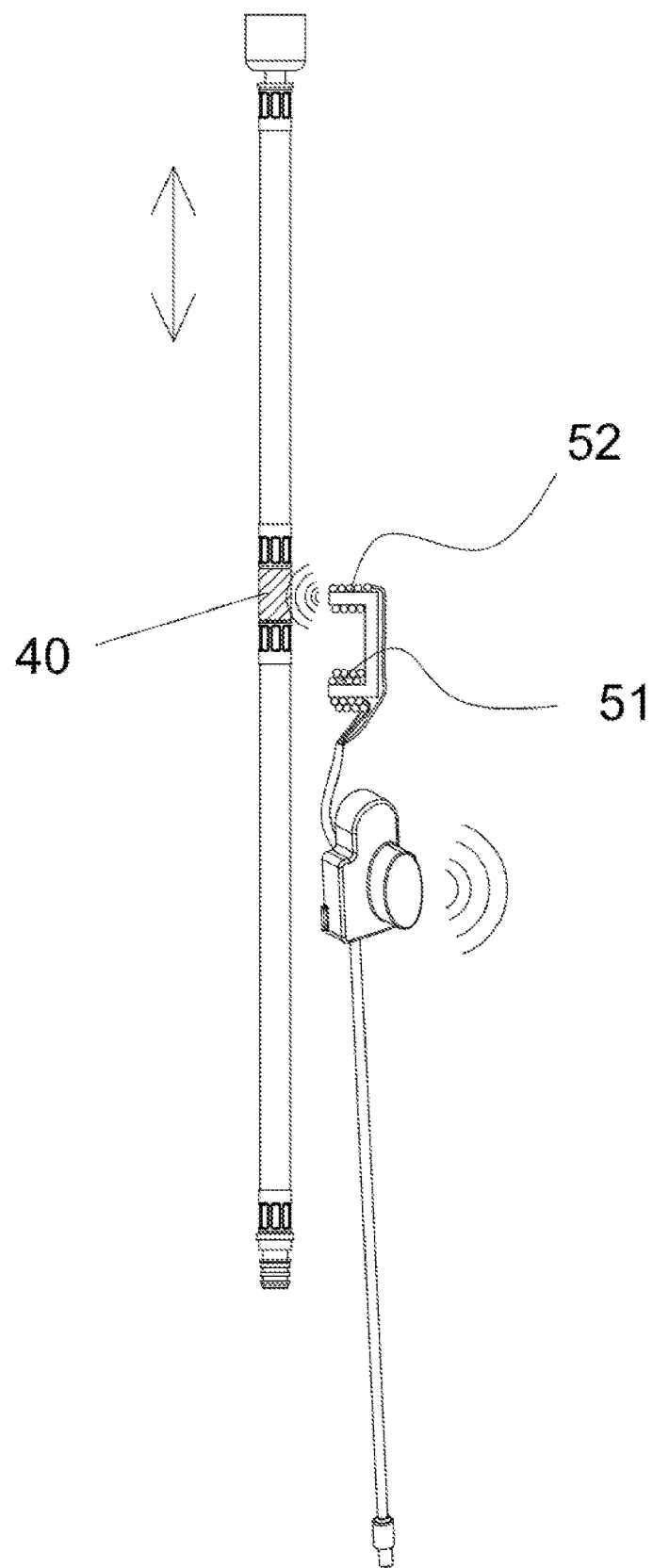
FIG. 8 is another schematic diagram showing the position of the induction coil of the pull-out hose according to one embodiment of the present disclosure.

Specifically, as shown in FIGS. 7 and 8, in another embodiment, the induction coil component 50 comprises a first induction coil 51 and a second induction coil 52. The first induction coil 51 and the second induction coil 52 are arranged at different heights of the faucet body 10. Turns of the first induction coil 51 differ from turns of the second induction coil 52.

In the embodiment, during the pull-out process, the first induction coil 51 first senses the metal component 40 and then the second induction coil 52 senses the metal component 40. During the retraction process, the second induction coil 52 senses the metal component 40 then the first induction coil 51 senses the metal component 40. Since the turns of the first induction coil differ from the turns of the second induction coil 52, strengths of induction signals are different. In this way, the current pulling direction is identified through a strength of a current induction signal. It is predetermined that the water only flows in the pull-out direction. Therefore, the induction coil component is prevented from failing to sense or mis-sensing the metal component 40 due to the metal component 40 being out of position, and the occurrence of functional failure of the inductive pull-out faucet is avoided.

Foregoing description shows and describes the optional embodiments of the present disclosure. As previously mentioned, it should be understood that the present disclosure is not limited to the embodiments disclosed herein, and should not be regarded as an exclusion of other embodiments. The embodiments can be used in various and other combinations, modifications and environments, and can be modified within the scope of concepts described herein, from the above description or from skill or knowledge in the prior art. Furthermore, modifications and changes made by those skilled in the art that do not depart from the spirit and scope of the present disclosure should fall within the protection scope of the attached claims of the present disclosure.

What is claimed is:

1. An inductive pull-out faucet, comprising:
a faucet body defining a pulling channel;
a pull-out hose movably disposed in the pull-out channel;
a pulling head connected with a water outlet end of the pulling hose;
a control valve configured to control opening and closing of the water outlet channel; and
a switch assembly electrically connected with the control valve;
wherein the pull-out hose defines a water outlet channel; the switch assembly comprises a metal component and an induction coil component; the metal component is fixedly connected with one of the faucet body and the pull-out hose; the induction coil component is fixedly connected with the other one of the faucet body and the pull-out hose; during a pulling process of the pull-out hose, the metal component is close to or away from the induction coil component to generate an alternating magnetic field; when an attenuation value of the alternating magnetic field reaches a first predetermined value or when an inductance value of the alternating magnetic field reaches a second predetermined value, the control valve controls the water outlet channel to open or close;
wherein the metal component is a metal sleeve sleeved on an outer side of the pull-out hose; the induction coil component is disposed in the faucet body and is wound around the pull-out hose along a circumferential direction of the pull-out hose;
wherein the faucet body comprises a magnetic core; the magnetic core is disposed in a direction perpendicular to an axis line of the pull-out hose; the induction coil component is wound around an outer periphery of the magnetic core.

2. The inductive pull-out faucet according to claim 1, wherein one side of the induction coil component facing the metal component is defined as an induction surface.

3. The inductive pull-out faucet according to claim 1, wherein the metal component is made of iron, copper, or stainless steel.

4. The inductive pull-out faucet according to claim 1, wherein the inductive pull-out faucet further comprises a circuit control board and an infrared sensing window.

5. An inductive pull-out faucet, comprising:
a faucet body defining a pulling channel;
a pull-out hose movably disposed in the pull-out channel;
a pulling head connected with a water outlet end of the pulling hose;
a control valve configured to control opening and closing of the water outlet channel; and
a switch assembly electrically connected with the control valve;
wherein the pull-out hose defines a water outlet channel; the switch assembly comprises a metal component and an induction coil component; the metal component is fixedly connected with one of the faucet body and the pull-out hose; the induction coil component is fixedly connected with the other one of the faucet body and the pull-out hose; during a pulling process of the pull-out hose, the metal component is close to or away from the induction coil component to generate an alternating magnetic field; when an attenuation value of the alternating magnetic field reaches a first predetermined value or when an inductance value of the alternating magnetic field reaches a second predetermined value, the control valve controls the water outlet channel to open or close;
wherein the metal component is a metal sleeve sleeved on an outer side of the pull-out hose; the induction coil component is disposed in the faucet body and is wound around the pull-out hose along a circumferential direction of the pull-out hose;
wherein the faucet body comprises a U-shaped frame disposed inside the faucet body; and the induction coil component is wound on the U-shaped frame and cooperates with the metal component to form a U-shaped magnetic circuit.

* * * * *